United States Patent [19]
Yoo et al.

[11] Patent Number: 6,130,721
[45] Date of Patent: Oct. 10, 2000

[54] VIDEO FORMAT MODE DETECTOR

[75] Inventors: Joong-Sun Yoo, Suwon-shi; Yeon-Mo Jeong, Seoul; Ju-Soon Hong, Suwon-shi, all of Rep. of Korea

[73] Assignee: SamSung Electronics Co., Ltd., Suwon, Rep. of Korea

[21] Appl. No.: 09/377,910

[22] Filed: Aug. 20, 1999

[30] Foreign Application Priority Data

Aug. 20, 1998 [KR] Rep. of Korea ............ 98-33747

[51] Int. Cl.⁷ .................................................. H04N 5/46
[52] U.S. Cl. .................................... 348/558; 348/524
[58] Field of Search .................................. 348/558, 554, 348/555, 524; H04N 5/46, 3/27

[56] References Cited

U.S. PATENT DOCUMENTS

| | | |
|---|---|---|
| 4,991,023 | 2/1991 | Nicols . |
| 5,404,153 | 4/1995 | Kim . |
| 5,691,780 | 11/1997 | Marshall ................. 348/524 |
| 5,694,175 | 12/1997 | Gaigneux et al. . |
| 5,790,096 | 8/1998 | Hill, Jr. . |
| 5,825,435 | 10/1998 | Vriens et al. . |
| 5,838,381 | 11/1998 | Kasahara et al. . |

*Primary Examiner*—Sherrie Hsia
*Attorney, Agent, or Firm*—Robert E. Bushnell, Esq.

[57] ABSTRACT

A video format mode detector for detecting the format mode of a video signal transmitted from a video data output device such as personal computer, which includes a counter for counting a horizontal synchronous signal input during one cycle of a vertical synchronous signal separated from the video signal, generating positive counting data and negative counting data, a data holder for holding the output from the counter whenever the horizontal synchronous signal separated from the video signal is applied thereto, a data adder for adding up positive holding data and negative holding data sent from the data holder whenever the horizontal synchronous signal is applied thereto, generating data which indicates the number of horizontal lines corresponding to one cycle of the vertical synchronous signal, a data comparator for comparing the positive holding data and negative holding data with each other, outputting data having the smaller value, and a mode discrimination part for searching an ROM included therein, generating a video format mode detection signal corresponding to the data sent from the data adder and data comparator.

7 Claims, 9 Drawing Sheets

| STANDARD | | IMB | | VESA | | | | |
|---|---|---|---|---|---|---|---|---|
| | | VGA2 70Hz | VGA3 60Hz | 640 72Hz | 800 60Hz | 800 75Hz | 1024 60Hz | 1024 75Hz |
| H-resolution | Pixels | 720 | 640 | 640 | 800 | 800 | 1024 | 1024 |
| V-resolution | lines | 400 | 480 | 480 | 600 | 600 | 768 | 768 |
| H-frequency | kHz | 31.469 | 31.469 | 37.861 | 37.879 | 46.875 | 48.363 | 60.023 |
| V-frequency | Hz | 70.087 | 59.940 | 72.809 | 60.317 | 75.000 | 60.004 | 75.029 |
| Pixel frequency | MHz | 28.322 | 25.175 | 31.500 | 40.000 | 49.500 | 65.000 | 78.750 |
| Pixel time | n sec | 35.308 | 39.722 | 31.746 | 25.000 | 20.202 | 15.385 | 12.698 |
| Line time | u sec | 31.777 | 31.778 | 26.413 | 26.400 | 21.333 | 20.677 | 16.660 |
| Frame time | m sec | 14.268 | 16.683 | 13.735 | 16.579 | 13.333 | 16.666 | 13.328 |
| H. Addressable | Pixels | 720 | 640 | 640 | 800 | 800 | 1024 | 1024 |
| H Right Border | Pixels | 9 | 8 | 8 | 0 | 0 | 0 | 0 |
| H Front Porch | Pixels | 9 | 8 | 16 | 14 | 16 | 24 | 16 |
| H Sync | Pixels | 108 | 96 | 40 | 128 | 80 | 136 | 96 |
| HBack Porch | Pixels | 45 | 40 | 120 | 88 | 160 | 160 | 176 |
| H Left Border | Pixels | 9 | 8 | 8 | 0 | 0 | 0 | 0 |
| H Total | Pixels | 900 | 800 | 832 | 1056 | 1056 | 1344 | 1312 |
| V Addressable | Lines | 400 | 480 | 480 | 600 | 600 | 768 | 768 |
| V Bottom border | Lines | 7 | 8 | 8 | 0 | 0 | 0 | 0 |
| V Front Porch | Lines | 6 | 2 | 1 | 1 | 1 | 3 | 1 |
| V Sync | Lines | 2 | 2 | 3 | 4 | 3 | 6 | 3 |
| V Back Porch | Lines | 27 | 25 | 20 | 23 | 21 | 29 | 28 |
| V Top Border | Lines | 7 | 8 | 8 | 0 | 0 | 0 | 0 |
| V Total | Lines | 449 | 525 | 520 | 628 | 625 | 806 | 800 |

FIG. 8

| | Resolution | Standard | V freq | V total (pixels) | H sync pixels | H sync time | Clock 25 MHz (sync count) |
|---|---|---|---|---|---|---|---|
| 1 | 640x480 | IBM | 60 | 525 | 2 | 3.813 u | 95.3 |
| 2 | | VESA | 72 | 520 | 3 | 1.270 u | 31.7 |
| 3 | | | 75 | 500 | 3 | 2.032 u | 50.8 |
| 4 | | | 85 | 509 | 3 | 1.556 u | 38.9 |
| 5 | | MAC | 60 | 525 | 2 | 3.813 u | 95.3 |
| 6 | | | 67 | 525 | 3 | 2.116 u | 52.9 |
| 7 | 720x400 | IBM | 70 | 449 | 2 | 3.813 u | 95.3 |
| 8 | 800x600 | VESA | 56 | 625 | 2 | 2.000 u | 50 |
| 9 | | | 60 | 628 | 4 | 3.200 u | 80 |
| 10 | | | 72 | 666 | 6 | 2.400 u | 60 |
| 11 | | | 75 | 625 | 3 | 1.616 u | 40.4 |
| 12 | | | 85 | 631 | 3 | 1.138 u | 28.4 |
| 13 | 832x624 | MAC | 75 | 667 | 3 | 1.117 u | 27.9 |
| 14 | 1024x768 | IBM | 43.5 | 817 | 8 | 3.920 u | 98 |
| 15 | | VESA | 60 | 806 | 6 | 2.092 u | 52.3 |
| 16 | | | 70 | 806 | 6 | 1.813 u | 45.3 |
| 17 | | | 75 | 800 | 3 | 1.219 u | 30.4 |
| 18 | | | 85 | 808 | 3 | 1.016 u | 25.4 |
| 19 | | MAC | 60 | 813 | 6 | 1.500 u | 37.5 |
| 20 | | | 75 | 804 | 3 | 1.200 u | 30 |
| 21 | 1152x870 | MAC | 75 | 915 | 3 | 1.280 u | 32 |

FIG. 9

VIDEO FORMAT MODE DETECTOR

CLAIM OF PRIORITY

This application makes reference to, incorporates the same herein, and claims all benefits accruing under 35 U.S.C §19 from an application entitled Video Format Mode Detector earlier filed in the Korean Industrial Property Office on Aug. 20, 1998, and there duly assigned Serial No. 98-33747 by that Office.

BACKGROUND OF THE INVENTION

1. Field of the Invention

The present invention relates to an image processing system, and in particular, to a video format mode detector which detects the format mode of a video signal transmitted from an image data output device.

2. Description of the Related Art

With rapid spread of computer in the age of information and multimedia, personal computers become the necessities of life. Since the personal computer serves as a multimedia, there has been efforts to display images required for internet, PC communications, video conference, games, and education programs such as movies using the personal computer on a larger picture effectively and vividly. This requires, first of all, a display device having larger picture, for example, television receiver (referred to as TV hereinafter) or screen. A large-sized TV is frequently used because the screen has low brightness and resolution. This produces a problem that TV is fixed in NTSC or PAL mode while the format mode of a video signal transmitted from the personal computer is one of various modes such as VGA, SVGA and XGA.

Meanwhile, employing a separate display requires a device for connecting the display to the personal computer. Furthermore, the device for connection is required to adjust the output resolution of the personal computer to meet the resolution of the display. However, due to the various format modes of the video signals transmitted from the personal computer, it is difficult to design the device for converting the format of the video signal received from the computer according to the resolution of the display connected to the device. Accordingly, a wide variety of methods and devices have been contemplated for controlling a video display device to display video signals of different formats as exemplified by the following references, incorporated herein by reference: U.S. Pat. No. 5,790,096 to Jacques R. Hill, Jr. entitled Automated Flat Panel Display Control System For Accommodating Broad Range Of Video Types And Formats; U.S. Pat. No. 5,825,435 to Leendert Vriens et al. entitled Color Cathode Ray Tube And display Device; U.S. Pat. No. 5,838,381 to Yasuhiro Kasahara et al. entitled Image Display Apparatus Capable Of Displaying Personal Computer Signals And Television Signal By Conversion Into A Signal Of A Higher Number Of Pixels; U.S. Pat. No. 4,991,023 to Gary H. Nicols entitled Microprocessor Controlled Universal Video Monitor; U.S. Pat. No. 5,404,153 to Manbok Kim entitled Super VGA Monitor Interface Circuit; and U.S. Pat. No. 5,694,175 to Frederic Gaigneux et al. entitled Method For Recognition Of Video Standards And Circuit For Implementing This Method.

Accordingly, we have determined that there is a need for a video format mode detector which is able to automatically detect various format modes of video signals output from the personal computer.

SUMMARY OF THE INVENTION

It is therefore an object of the present invention to provide a video format mode detector which detects the format mode of a video signal transmitted from an image data output device such as personal computer.

To achieve the above objects, there is provided a video format mode detector for detecting the format mode of a video signal transmitted from an external device, which includes a counter for counting a horizontal synchronous signal input during one cycle of a vertical synchronous signal separated from the video signal, generating positive counting data and negative counting data, a data holder for holding the output from the counter whenever the horizontal synchronous signal separated from the video signal is applied thereto, a data adder for adding up positive holding data and negative holding data sent from the data holder whenever the horizontal synchronous signal is applied thereto, generating data which indicates the number of horizontal lines corresponding to one cycle of the vertical synchronous signal, a data comparator for comparing the positive holding data and negative holding data with each other, outputting data having the smaller value, and a mode discrimination part for searching an ROM included therein, generating a video format mode detection signal corresponding to the data sent from the data adder and data comparator.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 8 illustrates timing standards of video signals; and

FIG. 9 illustrates data stored in a ROM table included in a mode discrimination part for the purpose of detecting video format modes.

DETAILED DESCRIPTION OF THE INVENTION

Figure 1:
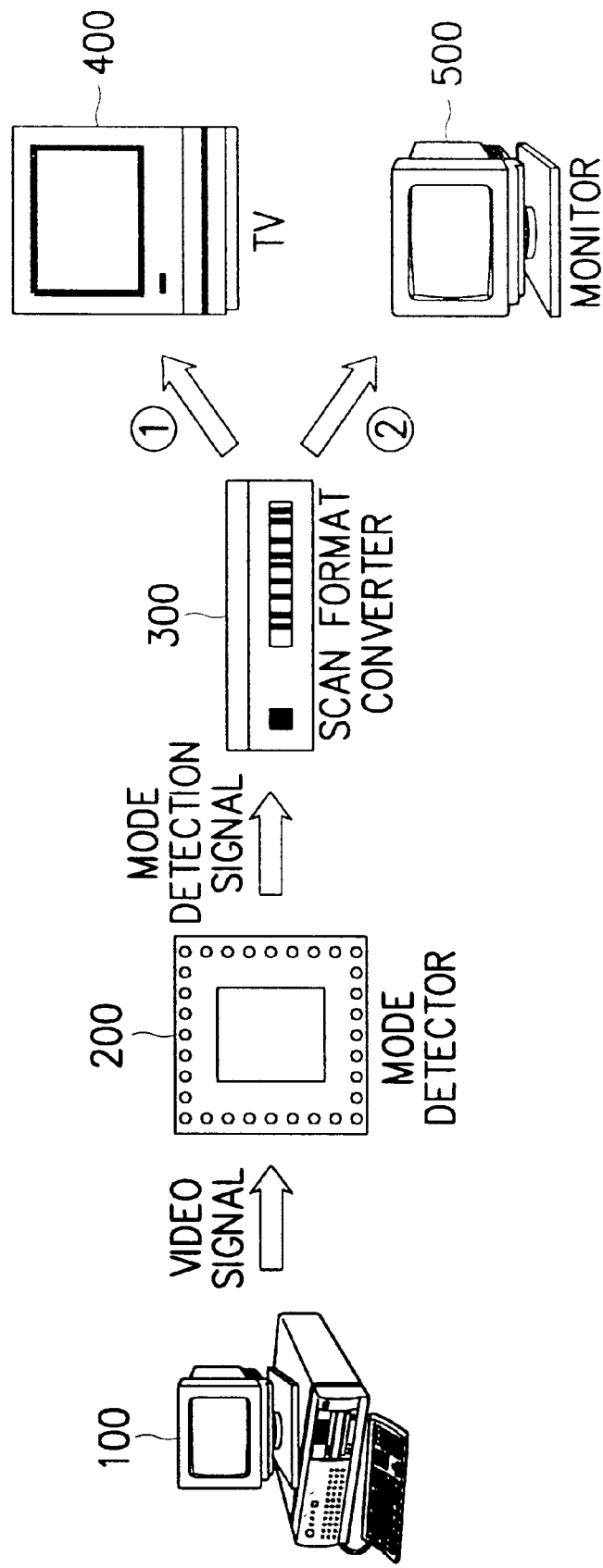
FIG. 1 illustrates a configuration of an image processing system including a video format mode detector according to an embodiment of the present invention.
Figure 2:
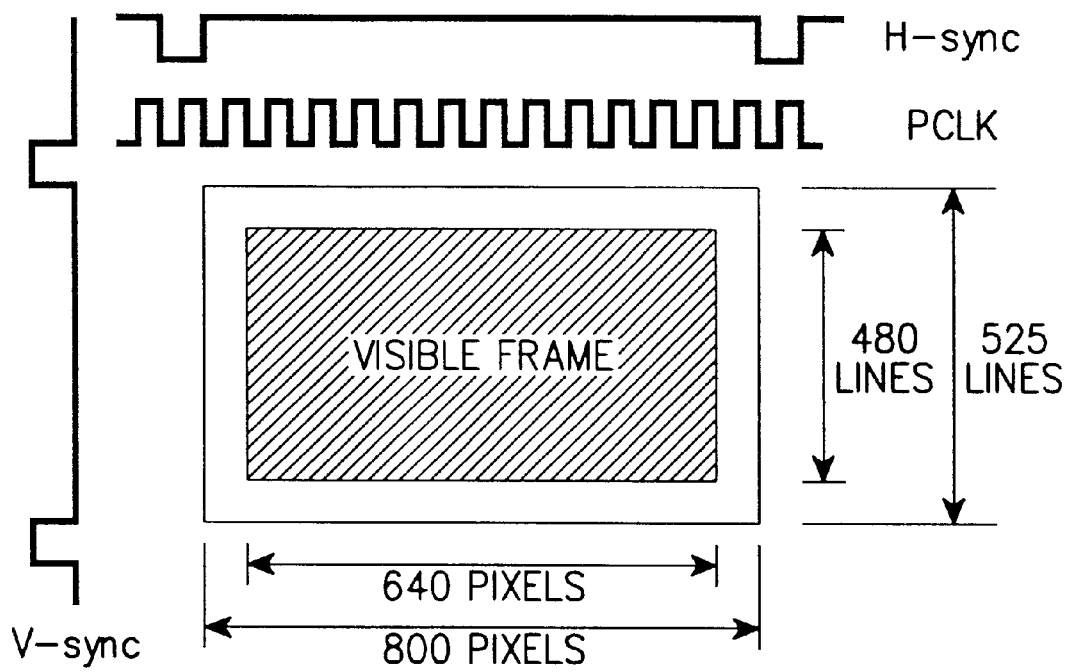
FIG. 2 illustrates a configuration of a VGA format frame having 640×480 resolution.
Figure 3:
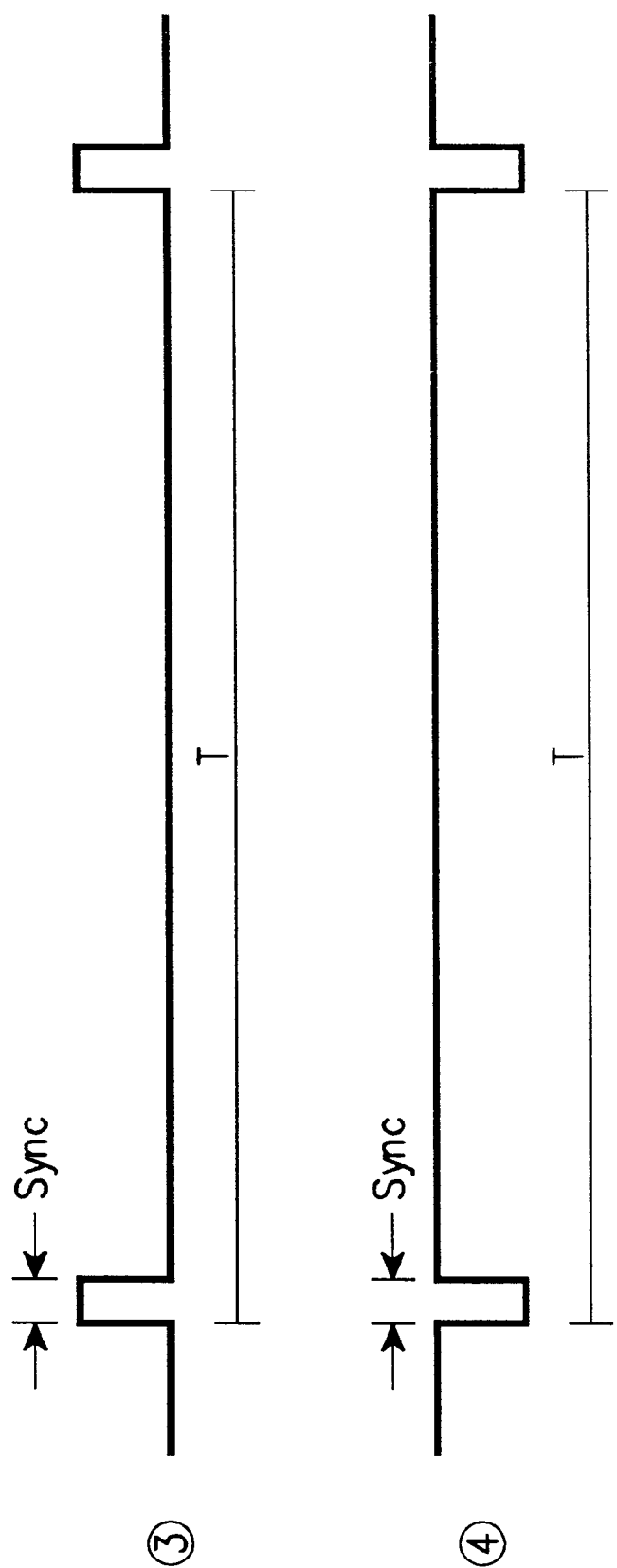
FIG. 3 illustrates one cycles of synchronous signals, having polarities opposite to each other.

To help understand the present invention, it is assumed that a video signal with 640×480 resolution is output from a personal computer. FIG. 1 illustrates a configuration of an image processing system including a video format mode detector according to an embodiment of the present invention, FIG. 2 illustrates a configuration of a VGA format frame having 640×480 resolution, and FIG. 3 illustrates one cycles of synchronous signals, having polarities opposite to each other. A video signal output from a personal computer 100, that is an output signal of a video card included in the computer, consists of R(Red), G(Green), B(Blue) color signals, ground signals for these color signals, a horizontal synchronous signal H_Sync constructing the lines of a picture, and a vertical synchronous signal V_Sync constructing a frame or field of a picture. This video signal is sent to a video format mode detector 200 (referred to as "mode detector" hereinafter) through video card output pins included in personal computer 100 as shown in FIG. 1. Mode detector 200 detects the format mode of the video signal received from computer 100 using the horizontal synchronous signal H_Sync and the vertical synchronous signal V_Sync and a reference clock signal having a specific frequency, and generates corresponding mode detection signal. A scan format converter 300 converts the format of the R, G, B data of the video signal with 640×480 resolution to meet the resolution of a display device according to the mode detection signal sent from mode detector 200. The format-converted video signals (1) and (2) are displayed on the display device, TV 400 or monitor 500. For reference, horizontal synchronous signal H Sync and vertical synchronous signal V_Sync of a video signal output from the video card using 18 M, VESA standard are applied to mode detector 200 through the thirteenth and fourteenth pins, respectively. Here, horizontal synchronous signal H_Sync and vertical synchronous signal V_Sync are output as digital signals. There will be explained below the configuration of a VGA format frame with 640×480 resolution with reference to FIG. 2. One picture (frame) is constructed of 525 lines, each line being synchronized with horizontal synchronous signal H_Sync. Picture elements (pixels) construct each of the 525 lines. With VGA mode, there are 704 pixels in one line and 96 pixels in the synchronous part of the line. Accordingly, 800 pixel clocks (referred to as PCLK) are included in one cycle of horizontal sync signal H_Sync. For one cycle of pixel clock PCLK, data processing is performed for R, G, B of one pixel constructing a picture. One cycle of horizontal synchronous signal H_Sync includes a right border, left border, front porch and back porch which have no picture data. The number of pixels corresponding to these parts and number of pixels corresponding to the synchronous part are subtracted from the total number of pixels included in one cycle of horizontal synchronous signal H_Sync, resulting in 640 pixels which make a visible line, a part having picture data. Vertical synchronous signal V_Sync includes the top border, bottom border, front porch and back porch which are constructed of lines having no picture data. The number of lines corresponding to these parts and number of lines corresponding to the synchronous part are subtracted from the total number of lines included in one cycle of vertical synchronous signal V_Sync, resulting in 480 lines which construct a visible frame.

As described above, the visible frame constructed of 640 pixels and 480 lines corresponds to a 640×480 mode which depends on various standards specified by IBM, VESA, SIGMA and MAC. Furthermore, characteristics of components forming a picture differ from frequencies used. The horizontal and vertical synchronous signals have different polarities depending on manufacturers, as shown in FIG. 3, while they are fixed in accordance with standards. In FIG. 3, reference numeral (3) represents a positive synchronous signal, (4) represents a negative synchronous signal, and T represents one cycle of a synchronous signal. Since the polarity of the synchronous signal depends on the manufacturer, an algorithm for detecting the video signal format using the synchronous signal becomes complicated.

Therefore, the present invention constructs a mode detector which is able to detect the format mode of a video signal only using a simple circuit configuration employing the synchronous signals and reference clock as its input without regard to the polarity of the synchronous signals.

Figure 4:
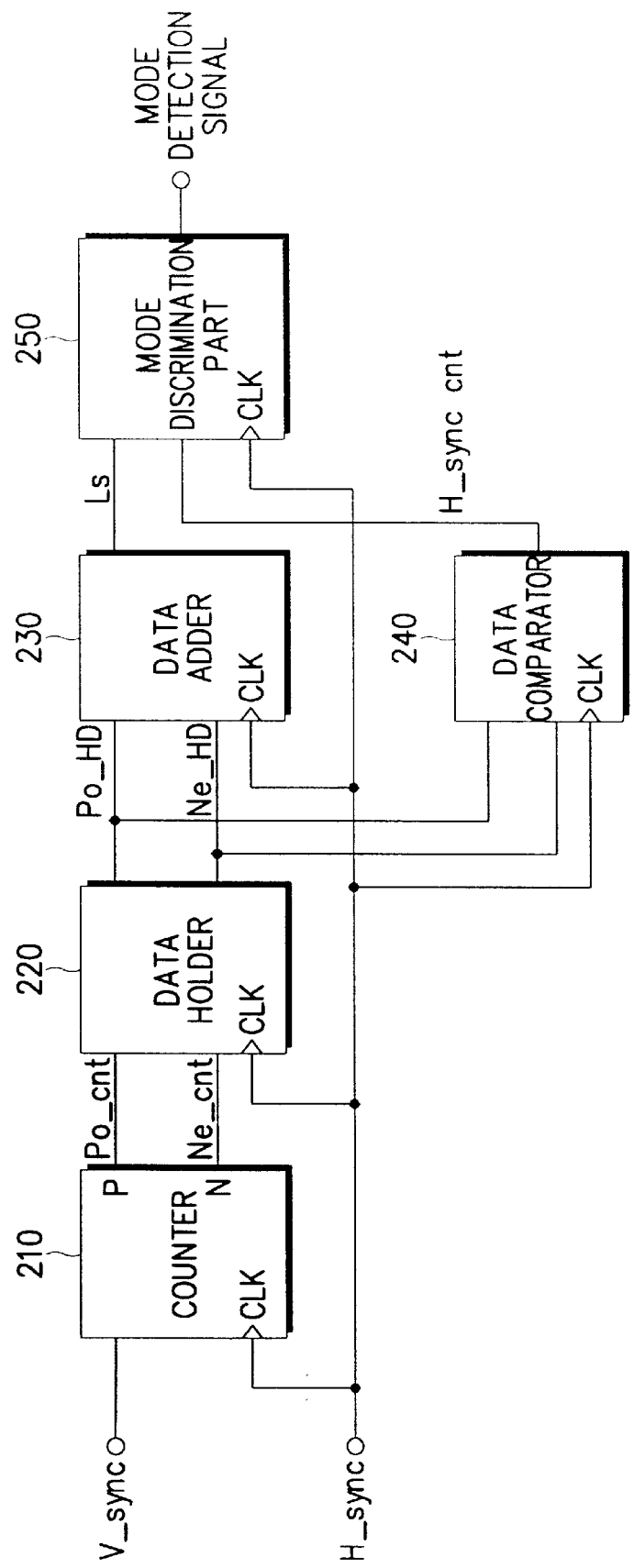
FIG. 4 illustrates a configuration of the video format mode detector of FIG. 1 in detail.
Figure 7:
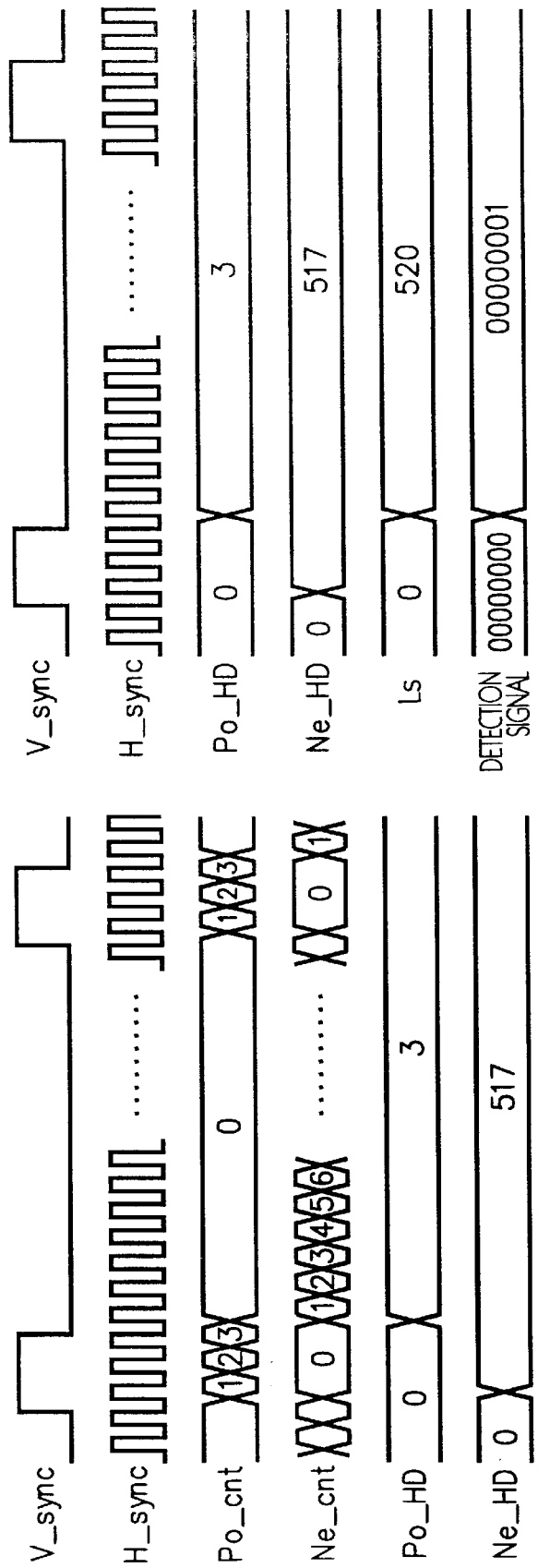
FIG. 7 illustrates operation timings of the video format mode detectors of FIGS. 4 and 6.

The configuration of the mode detector according to a preferred embodiment of the present invention is explained below. FIG. 4 illustrates a configuration of mode detector 200 of FIG. 1, and FIG. 7 illustrates the operation timings of mode detector 200 having the configuration of FIG. 4. FIG. 8 illustrates timing standards of video signals, and FIG. 9 illustrates data stored in a ROM table included in mode discrimination parts for the purpose of detecting video format modes. Mode detector 200 of FIG. 4 uses horizontal synchronous signal H_sync and vertical synchronous signal V_sync in order to detect the format mode of a video signal transmitted from an image data output device like personal computer. Referring to FIG. 4, a counter 210 counts horizontal synchronous signal H_sync which is input during one cycle of vertical synchronous signal V_sync separated from the video signal, generating positive counting data Po_cnt and negative counting data Ne_cnt. A data holder 220 holds the output of counter 210 whenever horizontal synchronous signal H_sync is applied thereto through its clock port CLK. A data adder 230 adds up positive holding data Po_HD and negative holding data Ne_HD output from data holder 220 whenever horizontal synchronous signal H_sync is applied, to generate data Ls which indicates the total number of horizontal lines corresponding to one cycle of vertical synchronous signal V_sync. A data comparator 240 compares positive holding data Po_HD and negative holding data Ne_HD with each other to output data having the smaller value. A mode discrimination part 250 searches a ROM table included therein, outputting a mode detection signal which indicates a video format mode corresponding to the data sent from data adder 230 and data comparator 240. The data stored in the ROM table is shown in FIG. 9.

The operation of mode detector 200 is explained below. First of all, horizontal and vertical synchronous signals H_sync and V_sync which are digital signals are sent to counter 210 of mode detector 200 through the thirteenth and fourteenth pins of the video card included in personal computer 100, respectively. Horizontal and vertical synchronous signals H_sync and V_sync may be applied to counter 210 in a negative or positive state depending on mode characteristic of the video signal. It is assumed that horizontal and vertical synchronous signals H_sync and V_sync are input in the positive state hereinafter, as shown in FIG. 7. Under this assumption, counter 210 counts horizontal synchronous signal H_sync applied to its clock port CLK during which vertical synchronous signal V_sync is in "HIGH" and "LOW" states, and outputs the counted value through terminals P and N. Accordingly, terminals P and N of counter 210 respectively output positive counting data Po_cnt and negative counting data Ne_cnt, as shown in the left of FIG. 7. Meanwhile, the final count data of the output of counter 210 is needed to obtain the total number of horizontal lines (number of horizontal synchronous signal H_sync) included in one cycle of vertical synchronous signal V_sync constructing one picture, and data holding is required for holding the final value of variable count data values. Accordingly, data holder 220 holds positive counting data Po_cnt and negative counting data Ne_cnt generated by counter 210 for each event of horizontal synchronous signal H_sync applied to its clock port CLK, positive counting data Po_cnt and negative counting data Ne_cnt being varied whenever horizontal synchronous signal H_sync is input. Data adder 230 adds up positive holding data Po_HD and negative holding data Ne_HD generated by data holder 220 whenever horizontal synchronous signal H_sync is applied. By doing so, data adder 230 generates data Ls indicating the total number of lines corresponding to one cycle of vertical synchronous signal V_sync.

Data comparator 240 compares positive holding data Po_HD and negative holding data Ne_HD sent from data holder 220 with each other, to output data having the smaller value. Accordingly, data comparator 240 outputs the number of horizontal lines H_sync cnt which is counted during "HIGH" period (that is, synchronous period) of the vertical synchronous signal. Mode discrimination part 250 searches the ROM table included therein, to generate a mode detection signal corresponding to data sent from data adder 230 and data comparator 240, that is, the total number of horizontal lines included in one cycle of vertical synchronous signal V_sync and number of lines counted during the synchronous period. Therefore, scan format converter 300 shown in FIG. 1 converts VGA mode with resolution of 640×480, sent from personal computer 100, into a video format corresponding to the resolution of TV 400 or monitor 500 depending on the mode detection signal.

Figure 5:
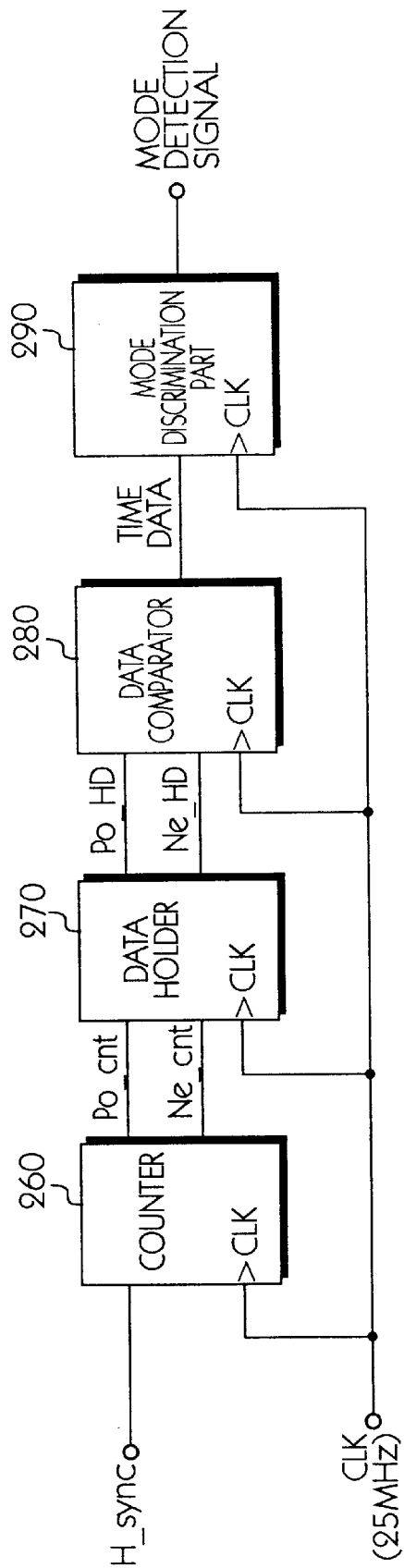
FIG. 5 illustrates a configuration of the video format mode detector according to another embodiment of the present invention.

There will be explained below the configuration and operation of a video format mode detector which counts horizontal synchronous signal H_sync using a reference clock CLK to detect the format mode of an input video signal according to another embodiment of the present invention. FIG. 5 illustrates the configuration of video format mode detector 200 according to another embodiment of the present invention. Referring to FIG. 5, video format mode 200 detector includes a counter 260, data holder 270, data comparator 280 and mode discrimination part 290. Counter 260 counts a 25 MHz reference clock during the synchronous period of horizontal synchronous signal H_sync separated from the input video signal to generate positive counting data Po_cnt and negative counting data Ne_cnt which correspond to time data of the synchronous period of horizontal synchronous signal H_sync.

Data holder 270 holds the time data of counter 260 whenever the reference clock is applied through its clock port CLK. Data comparator 280 compares the time data held, outputting data having the smaller value. Mode discrimination part 290 searches an ROM table included therein to detect a video format mode corresponding to the time data sent from data comparator 280, generating corresponding mode detection signal. Accordingly, scan format converter 300 shown in FIG. 1 converts VGA mode with 640×480 resolution transmitted from personal computer 100 into a video format corresponding to the resolution of TV 400 or monitor 500 depending on the mode detection signal.

Figure 6:
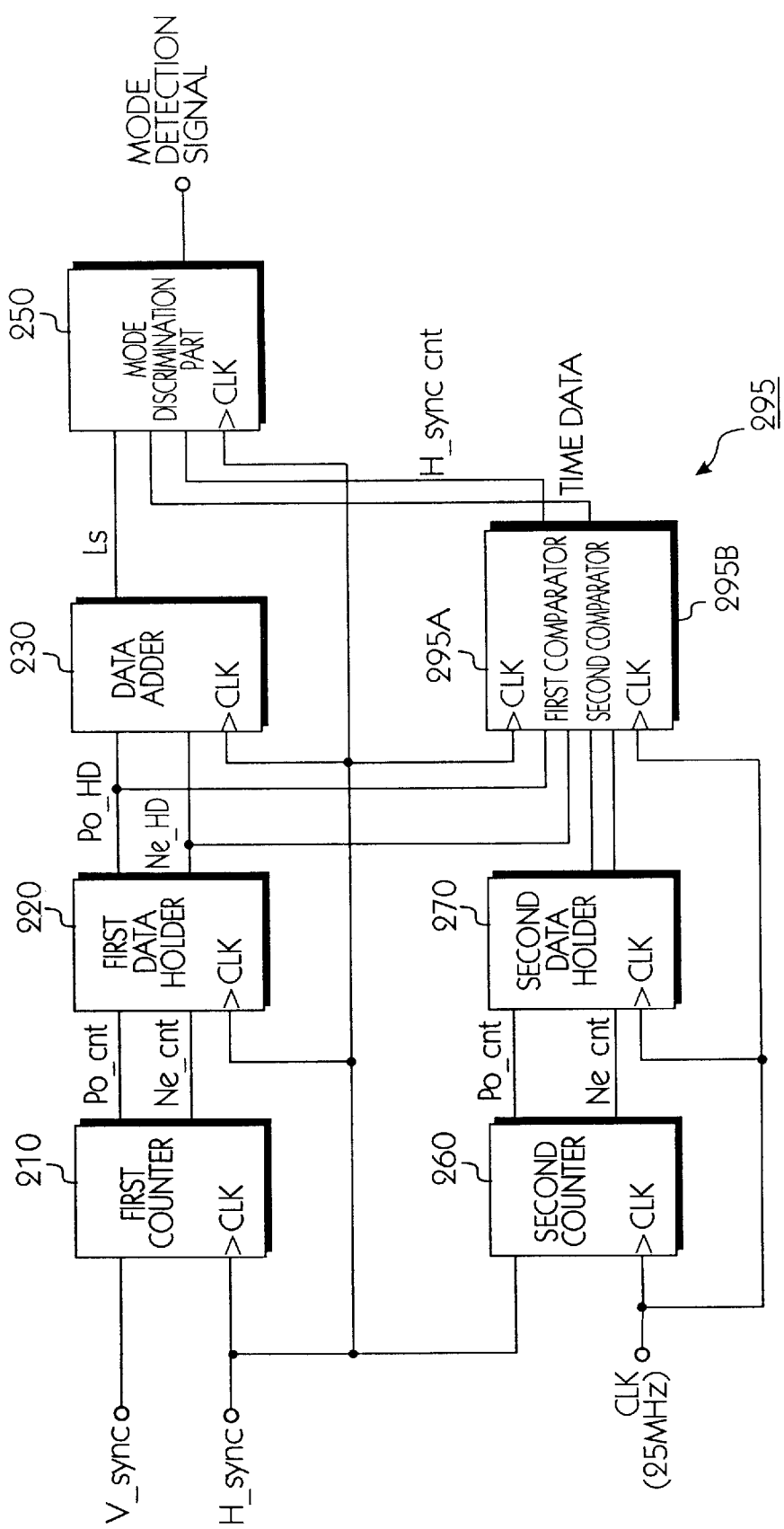
FIG. 6 illustrates a configuration of the video format mode detector according to another embodiment of the present invention.

FIG. 6 illustrates the configuration of video format mode detector 200 according to another embodiment of the present invention, which is constructed by combining the video format mode detectors of FIGS. 4 and 5 with each other. Referring to FIG. 6, a first counter 210 counts horizontal synchronous signal H_sync during which vertical synchronous signal V_sync is in "HIGH" and "LOW" states, generating positive counting data Po_cnt and negative counting data Ne_cnt. A first data holder 220 holds the positive counting data Po_cnt and negative counting data Ne_cnt for each event of horizontal synchronous signal H_sync input through its clock port CLK. Data adder 230 adds up positive holding data Po_HD and negative holding data Ne_HD generated by first data holder 220 whenever horizontal synchronous signal H_sync is applied thereto. By doing so, data adder 230 outputs data Ls indicating the total number of horizontal lines corresponding to one cycle of vertical synchronous signal V_sync. A first comparator 295A constructing a data comparator 295 compares positive holding data Po_HD and negative holding data Ne_HD sent from first data holder 220 with each other, outputting data having the smaller value. Accordingly, data comparator 295 outputs the number of horizontal lines H_sync cnt counted for "HIGH" period (that is, synchronous period) of the vertical synchronous signal. Mode discrimination part 250 searches a ROM table included therein, generating a mode detection signal corresponding to data sent from data adder 230 and data comparator 295, that is, the total number of horizontal lines H_sync cnt included in one cycle of the vertical synchronous signal and the number of lines Ls counted for the synchronous period. A second counter 260 counts the synchronous period of horizontal synchronous signal H_sync separated from the input video signal with 25 MHz reference clock, generating positive counting data Po_cnt and negative counting data Ne_cnt which correspond to time data of the synchronous period of the horizontal synchronous signal. A second data holder 270 holds the time data of second counter 260 whenever the reference clock applied to its clock port CLK. A second comparator 295B included in data comparator 295 compares the holding time data with each other, outputting data having the smaller value. In this embodiment, though the data from the first comparator is sent to mode discrimination part 250, it is possible to design the mode detector in such a manner that the output data of the first and second comparators are selectively applied to mode discrimination part 250. If the output data from the second comparator is sent to mode discrimination part 250, mode discrimination part 250 searches the ROM table included therein to detect a video format mode corresponding to the time data sent from data comparator 295, generating corresponding mode detection signal. Therefore, scan format converter 300 shown in FIG. 1 can convert VGA mode with 640×480 resolution transmitted from personal computer 100 into a video format corresponding to the resolution of TV 400 or monitor 500.

According to the present invention, as described above, various format modes of standard video signal, caused due to different signal generation modes depending on manufacturers can be detected with one chip. Furthermore, the present invention can support the function of the scan format converter which converts various video format modes into formats corresponding to the resolutions of display devices. While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A video format mode detector for detecting the format mode of a video signal transmitted from an external device, the detector comprising:

a counter for counting horizontal synchronous signals input during one cycle of a vertical synchronous signal separated from the video signal, and generating positive counting data and negative counting data in response to said counting of said horizontal synchronous signals;

a data holder for holding the positive counting data and negative counting data output from the counter, respectively, as positive holding data and negative holding data in response to the horizontal synchronous signal;

a data adder for adding up the positive holding data and the negative holding data, output from the data holder, in response to the horizontal synchronous signal, to output data indicative of a number of horizontal lines present in said one cycle of the vertical synchronous signal;

a data comparator for comparing the positive holding data to the negative holding data to output the smaller one of said positive holding data to the negative holding data; and a mode discrimination part having a searchable table therein, said table being searched in response to the data output from said data adder and said data comparator for outputting a video format mode detection signal corresponding to the data output from the data adder and data comparator.

2. The video format mode detector as set forth in claim 1, wherein the positive counting data and negative counting data correspond to values resulting from counting the horizontal synchronous signals during the active period and non-active period of the vertical synchronous signal, respectively.

3. The video format mode detector as set forth in claim 1, wherein said table is stored in a ROM and said table stores the number of horizontal lines corresponding to one cycle of the vertical synchronous signal and the number of horizontal lines counted for the active period of the vertical synchronous signal, the numbers being stored as data in accordance with video format modes.

4. A video format mode detector for detecting the format mode of a video signal transmitted from an external device, the detector comprising:

a counter for counting a reference clock having a predetermined frequency during a synchronous period corresponding to one cycle of a horizontal synchronous signal separated from the video signal, said counter generating positive count data and negative count data;

a data holder for holding the positive and negative count data in response to the reference clock;

a data comparator for receiving and comparing the positive count data to said negative count output from the data holder, and outputting the smaller one of said positive count data and said negative count data; and a mode discrimination part for searching an table in response to the count data output from the data comparator to generate a corresponding mode detection signal.

5. The video format mode detector as set forth in claim 4, wherein said table is stored in a ROM and said table stores time data corresponding to the synchronous periods of the horizontal synchronous signals of existing video format modes, wherein one of said video format modes is detected when the count data output from the data comparator matches the stored time data.

6. A video format mode detector, comprising:

a first counter for counting horizontal synchronous signals input during one cycle of a vertical synchronous signal separated from a video signal, and generating positive counting data and negative counting data in response to said counting of said horizontal synchronous signals;

a first data holder for holding the positive counting data and negative counting data output from the first counter, respectively, as positive holding data and negative holding data in response to the horizontal synchronous signal;

a data adder for adding up the positive holding data and the negative holding data, output from the first data holder, in response to the horizontal synchronous signal, to output data indicative of a number of horizontal lines present in said one cycle of the vertical synchronous signal;

a second counter for counting a reference clock having a predetermined frequency during a synchronous period corresponding to one cycle of said horizontal synchronous signal, said counter generating positive count data and negative count data;

a second data holder for holding the positive and negative count data in response to the reference clock;

a first data comparator for comparing the positive holding data to the negative holding data, output from said first data holder, to output the smaller one of said positive holding data to the negative holding data;

a second data comparator for receiving and comparing the positive count data to said negative count output from the second data holder, and outputting the smaller one of said positive count data and said negative count data; and a mode discrimination part for generating a video format mode detection signal corresponding to the outputs from said data adder and said first and second data comparators by searching a table comprising time data corresponding to the synchronous periods of the horizontal synchronous signals of existing video format modes and the number of horizontal lines corresponding to one cycle of the vertical synchronous signal and the number of horizontal lines counted for the active period of the vertical synchronous signal, the numbers being stored as data in accordance with said existing video format modes.

7. The video format mode detector as set forth in claim 6, wherein said table is stored in a ROM.

* * * * *